(No Model.)
J. R. JUDD.
PORTABLE GYMNASTIC APPARATUS.
No. 250,738. Patented Dec. 13, 1881.
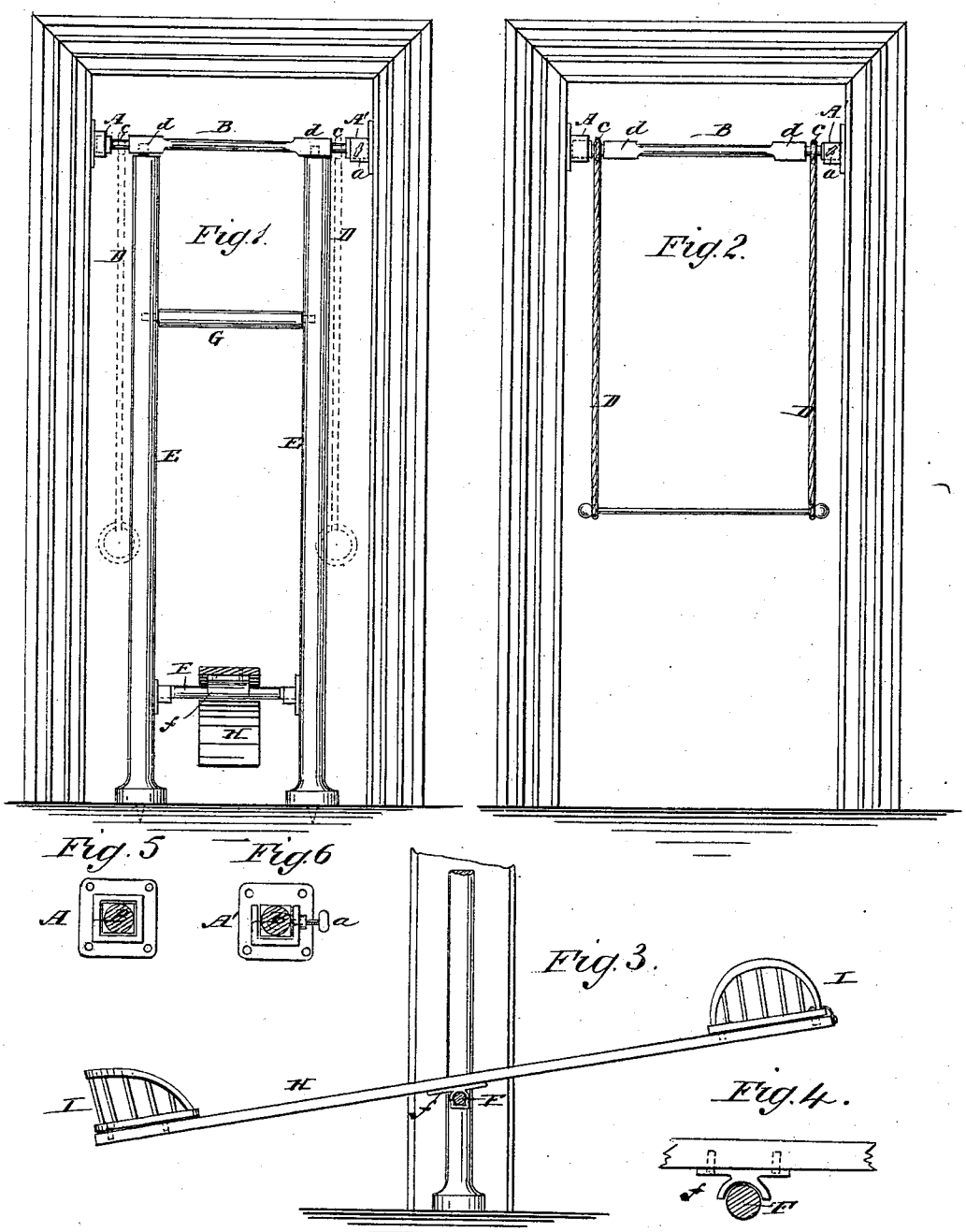

UNITED STATES PATENT OFFICE.

JOHN R. JUDD, OF NEW YORK, N. Y.

PORTABLE GYMNASTIC APPARATUS.

SPECIFICATION forming part of Letters Patent No. 250,738, dated December 13, 1881.

Application filed October 18, 1881. (No model.)

*To all whom it may concern:*

Be it known that I, JOHN RICHARD JUDD, of the city, county, and State of New York, have invented a new and useful Improvement in Portable Gymnastic Apparatus, of which the following is a full, clear, and exact description.

The object of my invention is to provide a complete gymnastic apparatus capable of being adjusted in the ordinary doorway of a room, and which can be put together and taken apart in a few seconds. The apparatus is adapted for use by full-grown persons or children. It consists of a horizontal bar for adult, horizontal bar for child, chest-bars, trapeze, gymnastic rings, swing for children, and seesaw for children.

Reference is to be had to the accompanying drawings, in which Figures I and II are plan views, showing my invention placed in a doorway. Figs. III and IV are detailed views, showing the manner of using the seesaw; Figs. V and VI, elevations of the doorway-brackets.

The horizontal bar B fits into two square sockets, A and A′, secured to the casing of doorway. These sockets are of sufficient depth to hold the ends of bar B. The socket A has four sides, while the socket A′ is formed with three square sides, so that the ends of bar can be placed in the sockets, or easily removed therefrom by raising end of bar B out of socket A′. Socket A′ is furnished with the thumb-screw $a$, as shown in Fig. VI, which may be screwed into horizontal bar to prevent it from getting loose.

The horizontal bar B, together with the sockets A and A′, in connection with the thumb-screw attached to the socket A′, keeps each portion of the apparatus firm, and furnishes the means of using the horizontal bar B, either alone or in connection with gymnastic rings, as shown in the dotted lines in Fig. I, or in connection with the vertical bars $e\ e$, or the trapeze D D, as shown in Fig. II, or the seesaw H in connection with the vertical bars $e\ e$. The extremities of the upper horizontal bar, B, are shaped with a hollow groove, $c\ c$, to which the trapeze D D, as shown in Fig. II, or a swing or the gymnastic rings, (shown in the dotted lines in Fig. I,) may be attached. The groove cut in the two ends of the horizontal bar prevents the ropes attached to trapeze, swing, or gymnastic rings from slipping. The trapeze, swing, or gymnastic rings may be fastened to horizontal bar B by a hook-bolt, if desired. The ends of horizontal bar are increased in size, as shown at $d\ d$, where a hole is bored half-way through, into which the upper extremity of the vertical chest-bars $e\ e$ fit. The said bars are fastened to horizontal bar B by dowel-pins, and made secure to the floor by small spikes screwed into the ends of the bars, as shown in the dotted lines in Fig. I. The horizontal bar G is placed from four to five feet from floor, and fastened to bars $e\ e$ by dowel pins and sockets, as shown in Fig. I. The third horizontal bar, F, is placed between the vertical bars $e\ e$ for the seesaw H to rock on. This bar has two brackets similar to those that fasten the upper horizontal bar, B. In the center of the seesaw-board H (shown in Fig. III) is secured the semi-cylindrical plate $f$, which is adapted to rest upon the bar F, for supporting the seesaw-board, as shown in Figs. III and IV.

Upon the ends of the seesaw H are secured the chairs I I, which are adapted, by means of dowel-pins or other similar means, to be reversed for arranging the seesaw to suit boy or girl.

From the foregoing description it will be seen that the invention consists of new and novel combinations of gymnastic apparatus capable of being placed in position or detached in a few seconds. It also appears that the several features of the apparatus may be used separately to suit the convenience of each individual. It is readily adapted for use by young or old, weak or strong, and provides a useful system of exercise for men, women, or children.

Having thus described my invention, what I desire to secure by Letters Patent is—

1. The sockets A and A′, in combination with the horizontal bar B, the socket A′ being open at the upper side and provided with the thumb-screw $a$, substantially as and for the purpose set forth.

2. The vertical bars $e\ e$, formed with dowel-pins at the top and provided with points at the bottom, in combination with the horizontal bar B and sockets A and A′, substantially as described.

3. The vertical bars $e\ e$, horizontal bar B, and horizontal bar F, in combination with the seesaw H, substantially as described.

4. The horizontal bar B, formed with the reduced portions c c, in combination with the trapeze or swing D, substantially as described.

5. The combination, with the vertical bars e e, horizontal bar B, and cross-bar F, of the seesaw H, provided with the semi-cylindrical bearing f, substantially as and for the purpose set forth.

6. In combination with the vertical bars e e and the horizontal bar B, the intermediate bar, G, substantially as and for the purpose described.

7. The seesaw H, provided with the semi-cylindrical bearing f, in combination with the reversible chairs I I, substantially as and for the purpose set forth.

JOHN RICHARD JUDD.

Witnesses:
THOMAS CLEARY,
PHILIP VAN VOLKENBURGH, Junior.